May 29, 1956  J. E. JONES  2,747,892
DETACHABLE BUMPER ATTACHED TRAILER HITCH
Filed Oct. 20, 1954  2 Sheets-Sheet 1
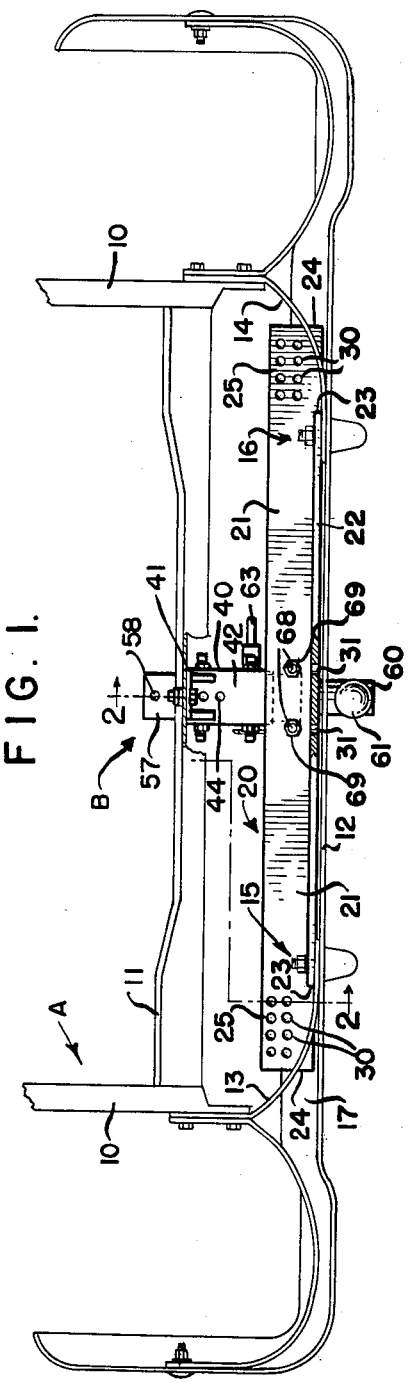
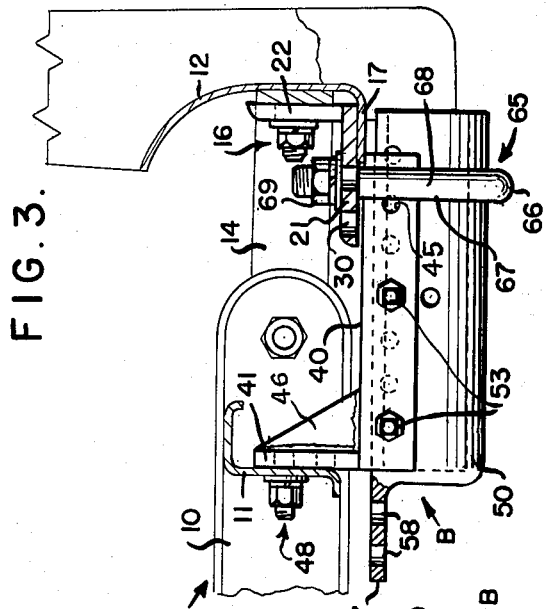
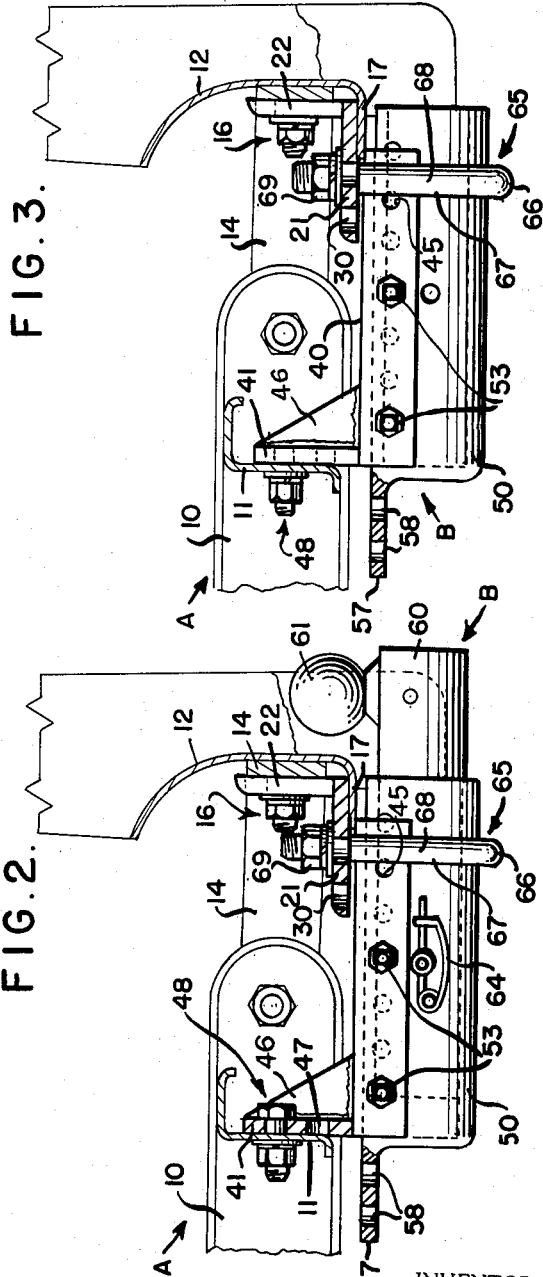
INVENTOR
James E. Jones May 29, 1956  J. E. JONES  2,747,892
DETACHABLE BUMPER ATTACHED TRAILER HITCH
Filed Oct. 20, 1954  2 Sheets-Sheet 2
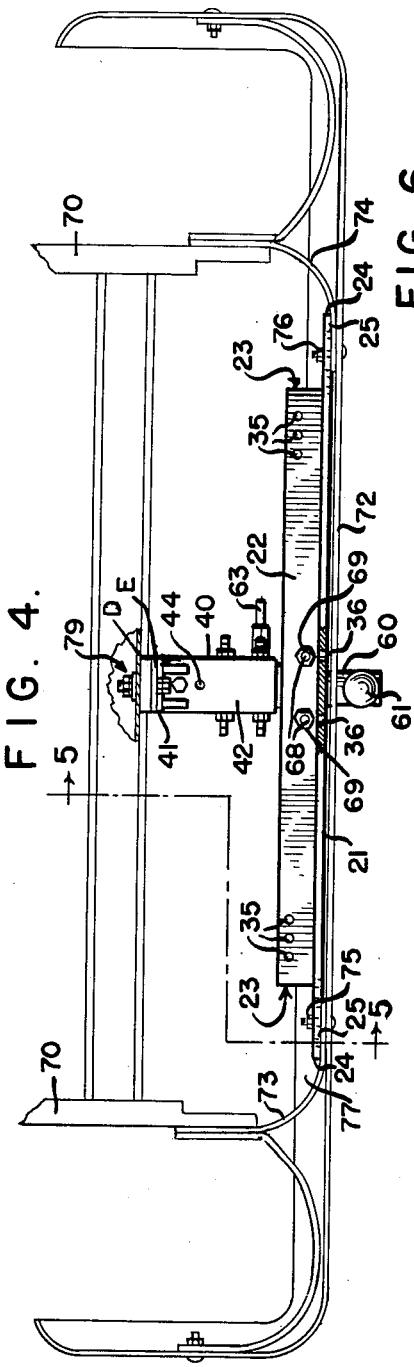
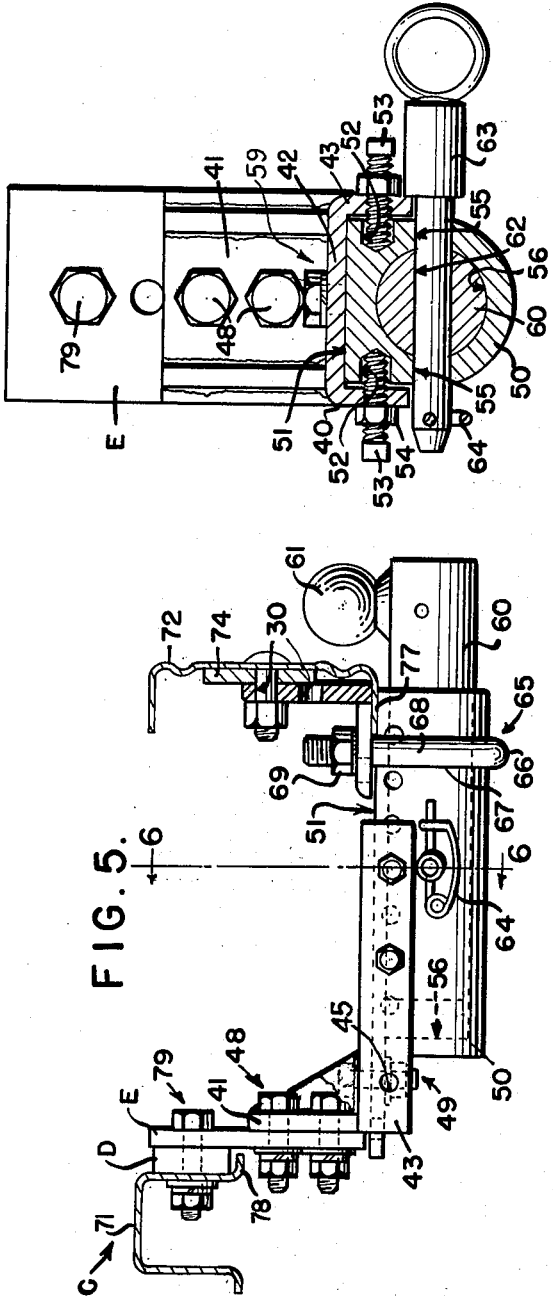
INVENTOR
James E. Jones
BY
ATTORNEYS

United States Patent Office 2,747,892
Patented May 29, 1956

2,747,892

DETACHABLE BUMPER ATTACHED TRAILER HITCH

James E. Jones, near Chattanooga, Tenn.

Application October 20, 1954, Serial No. 463,565

6 Claims. (Cl. 280—491)

This invention relates to trailer hitches.

An important object of the invention is to provide a a trailer hitch, attached partly to a rear cross frame member or similar rigid part of a vehicle chassis and partly to the rear bumper bar of the vehicle, whereby a very substantial connection of the hitch to the vehicle is afforded.

Another important object is to provide a trailer hitch, attached partly to a vehicle bumper bar but which attachment is a sliding one, so that the hitch will not interfere with movements of the bar.

Still another important object is to provide a trailer hitch which includes a substantial attachment to the bumper assembly by means of an elongated member extending longitudinally of the bumper bar and attached at the locations where the bumper bar is secured to the resilient metal bumper bar braces, employing the nut and bolt assemblies used in securing the bumper bar to these braces.

A further important object is to provide a hitch employing an elongated member one portion of which is for attachment to and longitudinally of the bumper bar of a vehicle and another portion of which is adapted to extend along and rest upon the lower flange of the bumper bar which association tends to brace the member while the first-mentioned portion tends to reinforce the bumper bar over a considerable portion of its length.

Additionally, an important object is to provide a trailer hitch in which the connection of the hitch with the vehicle's cross frame member is an adjustable one, permitting vertical and horizontal adjustment so that the hitch may be readily adjusted to bridge the cross frame member and bumper bar irrespective of the vertical position of the former with reference to the latter or the distance between the former and latter, whereby the hitch is adapted to be secured to vehicles of various makes, differing in the relative positions of cross frame members and bumper bars.

A further important object is to provide a trailer hitch which entails only one (or two) minor changes in a cross frame member in order to attach it thereto. This comprises the forming of one (or two) holes, which may be drilled, in the cross frame member. Attaching the hitch to the bumper bar requires that no alterations be made to the latter.

Other objects and advantages of the invention will be apparent during the course of the following detailed description of the invention, taken in connection with the accompanying drawings, forming portions of this disclosure, and in which drawings:

Fig. 1 is a fragmentary plan of the rear portion of a vehicle with the trailer hitch attached thereto.

Fig. 2 is a vertical section substantially on the line 2—2 of Fig. 1 and including the hitch-attached trailer-coupling means of the hitch.

Fig. 3 is a view, somewhat like that of Fig. 2 but with the trailer coupling means removed, such as when the hitch is not in use.

Fig. 4 is a fragmentary plan of the rear portion of a vehicle differing somewhat over the showing in Fig. 1 as to cross frame member and bumper bar.

Fig. 5 is a vertical section, substantially on the line 5—5 of Fig. 4.

Fig. 6 is a vertical section substantially on the line 6—6 of Fig. 5.

In the drawings, wherein for the purpose of illustration, is shown a preferred embodiment of the invention and wherein similar reference characters designate corresponding parts throughout the several views, the letter A designates one example of a vehicle; B, the trailer hitch; C, another example of a vehicle; and D and E means to adapt the trailer hitch B for attachment to the vehicle C.

For example, the vehicle A of Figs. 1, 2 and 3 may be a motor vehicle including a chassis 10 having a substantially rigid rear cross frame member 11 and a rear bumper assembly including a bumper bar 12 having resilient braces, such as the braces 13 and 14, less in width than the width of the bumper bar 12, secured to the chassis 10, and secured to the bumper bar 12 as by securing means comprising nut and bolt assemblies 15 and 16. The bumper bar 12 is shown to have a longitudinally-extending horizontally-disposed lower flange 17 extending toward the chassis 10.

The trailer hitch B of Figs. 1 to 6 inclusive, includes bumper-attaching means associated with the assemblies 15 and 16, comprising an elongated substantially rigid member 20 formed of a longer substantially flat elongated portion 21 and a shorter substantially flat elongated portion 22, normal thereto and rigid therewith to form substantially a right angle. The portion 22 may be slightly narrower than the portion 21. The end edges 23 of the portion 22 fall short of the end edges 24 of the portion 21 so that the extremities 25 of the portion 21 are free of any part of the portion 22, and the latter will not interfere with proper positioning of the portion 21 with its extremities 25 beneath portions of the bumper braces 13 and 14 as may be appreciated in Fig. 1.

A suitable number of spaced-apart securing means-accommodating openings 30 are in the extremities 25 of the portion 21 and selected of these openings may be employed as will be explained in connection with Figs. 4, 5 and 6. The openings 30 may be arranged in two rows of four openings each although this arrangement may be varied as found expedient. In addition, the portion 21 is provided with a suitable number of U-bolt-accommodating openings 31, such as two openings arranged adjacent and spaced a substantially equal distance from the transverse medial line of the portion 21.

The portion 22 is best shown in top plan in Fig. 4, and is provided with a suitable number of spaced-apart securing means-accommodating openings 35 at its extremities and these may be arranged in a row of three each. In addition, the portion 22 is provided with a suitable number of U-bolt-accommodating openings 36, such as two openings arranged adjacent and spaced a substantially equal distance from the transverse medial line of the portion 22.

Referring now to the cross member-attached means of the hitch, the same includes a horizontally-disposed portion 40 and a vertically-disposed portion 41 integral therewith. The portion 40 may be a section of so-called channel iron, comprising a central rectangular plate 42 and a pair of substantially paralleling flanges or walls 43 extending downwardly along the longitudinal edge portions of the plate 42. Along its longitudinal medial line of the portion 40 there is preferably provided a plurality of spaced apart bolt shank-accommodating openings 44 adjacent its outer end part and the flanges 43 are provided with a row of spaced-apart screw-threaded screw shank-accommodating openings 45 along the lengths of the flanges.

The vertically-disposed portion 41 is preferably a rectangular plate, disposed at the forward end part of the plate 42 and may be welded thereto and reinforced by braces 46 preferably disposed adjacent its upwardly extending end edges. The portion 41 is provided with a plurality of bolt shank-accommodating openings 47 extending along its vertical medial line for receipt of a portion of the shank of a nut and bolt assembly 48.

Associated with the cross member-attached means is a coupling support means comprising an elongated socketed member 50, shown in transverse section in Fig. 6, having a substantially flat upper surface 51 to slidably receive the plate 42 with at least the upper parts of the side walls of of the member 50 also being flat-surfaced at their outer faces to slidably receive the flanges 43 and portions of a U-bolt structure 65 to be subsequently described. Suitable spaced-apart sockets 52 extend into these side walls and are adapted to receive the free end portions of set screws 53 other portions of the shanks of which extend into the screw-threaded openings 45 and may have lock nuts 54 associated therewith. The socketed member 50 has a pair of axially-aligning transverse openings 55 intermediate its ends, adapted to receive portions of the shank of a shoulder pin 63 to be subsequently described. The lower portion of the member 50 is preferably provided with a transversely curved surface, extending to the flat parallel upwardly-extending outer surfaces of the side walls of the member 50, for a purpose later detailed. Preferably, the socket 56 of the member 50 is transversely circular and is adapted to slidably receive the coupling means subsequently to be described. The socket 56 opens at the rear portion of the hitch and at the preferably closed end of the member 50 there is a longitudinally extending flat horizontal flange 57, best shown in Figs. 2 and 3 and in use in Fig. 5, provided with a row of a plurality of bolt shank-accommodating openings 58 for a portion of a shank of a nut and bolt assembly 59, another portion of the shank of which extends through a suitable one of the openings 44 in the plate 42, as may be appreciated in Fig. 5.

Coupling means preferably takes the form of a cylinder 60 slidably received in the socket 56 and projecting outwardly therefrom, and a projection 61, as the ball of a conventional ball-and-socket connection, well known in the art, integral with and extending transversely of the cylinder 60. The latter is provided with a transverse opening 62 therethrough and intermediate its ends to receive a portion of the shank of a shoulder pin 63 other portions of which also extend through the openings 55 as in Fig. 6. The shoulder pin, adjacent its free end which extends outwardly of the member 50, may carry a safety shoulder pin fastener 64, well known in the art. This pin 63 provides a removable coupling between the socketed member 50 and cylinder 60 so that the latter may be removed, for example, when not in use, and as may be appreciated in Fig. 3.

The provision of a slidable connection means between the elongated rigid member 20 of the bumper-attaching means and the elongated socketed member 50 coupling support means is an important part of the hitch B and comprises a U-bolt structure 65, with the bight 66 of the U-bolt 67 engaging the curved face of the wall of the elongated socketed member 50 and portions of the upwardly-extending arms 68 of the U-bolt facing and slidably extending along portions of the flat, upwardly-extending outer surfaces of the side walls of the socketed member 50 as may be appreciated in Fig. 5 or over portions of the outer faces of the flanges 43 as may be appreciated in Figs. 2 and 3. The upper portions of these arms 68 are adapted to extend through the openings 31 or 36 in the portions 21 or 22, depending upon which portion is disposed horizontally (in Fig. 1, the portion 21 is disposed thusly and in Fig. 4 the portion 22 is disposed horizontally). The screw-threaded free end portions of the arms 68 are adapted to receive suitable nuts 69, tightened to support the socketed member 50 as in Figs. 2, 3 and 5. As a result, if the bumper 12 is struck, it is free to vibrate, since the U-bolt structure 65 may move over the surfaces mentioned, and, thus, although the hitch B is attached both to the bumper 12 and the cross frame member 11, it will not interfere with proper functioning of the bumper assembly.

A suitable hole may be drilled in the center of the rear cross frame member 11 through which extends a shank portion of the nut and bolt assembly 48 and another portion of this shank extends through a selected opening 47 in the portion 41 to secure the latter to the rear cross frame member 11.

Portions of the shanks of the nut and bolt assemblies 15 and 16 when the nuts are removed may be slid into suitable openings 35 and the nuts tightened.

By adjusting the socketed member 50 longitudinally of the portion 40, the projection 61 may be disposed rearwardly of the rear bumper 12 in position for use. Of course this necessitates positioning the set screws 53 so that their free ends will enter suitable sockets 52.

It will be noted, as in Figs. 2 and 3, that the flange 17 in part supports the portion 21 and reinforces the latter.

In Fig. 4 there is illustrated portions of a second vehicle C in which the space between the rear cross frame member 71 of the chassis 70 is of a shape different from that of the rear cross frame member 11 and is disposed a greater distance from the bumper bar 72 of the rear bumper assembly than is the distance between the rear cross frame member 11 and bumper bar 12 of the vehicle A, and the resilient braces 73 and 74 are farther apart than in Fig. 1, so that their nut and bolt assemblies 75 and 76 are also farther apart than in Fig. 1. In such case, as shown particularly in Figs. 5 and 6, there may be employed adapter means D so that the horizontally-disposed flange 78 of the cross frame member 71 will not interfere with proper coupling of the cross member attaching means of the hitch B to this cross member 71. The means D may be of a block of suitable material, as hardwood or metal to fit against the body of the cross member 71 and its flange 78 and which block is provided with an opening to receive a portion of the shank of a nut and bolt assembly 79. Also, because of the wider bumper 72, there is provided the means E which may comprise a vertically-disposed rigid metallic strap or plate having suitable openings for a portion of the shank of the assembly 78 and to receive portions of two shanks of nut and bolt assemblies 48 as in Figs. 5 and 6.

Because of the greater distance between the bumper bar 72 and the cross frame member 71, the hitch B must be lengthened over the showing in Figs. 1, 2 and 3. This is accomplished by sliding the member 50 longitudinally of the portion 40 and employing a nut and bolt assembly 49 with a portion of the shank thereof extending through suitable aligned openings 44 and 58.

The U-bolt structure 65 functions in the arrangement shown in Figs. 4, 5 and 6 exactly as it does in Figs. 1, 2 and 3, in that it may slide back and forth due to movements of the bumper bar 72. Not only this but the bumper bar 12 or 72 may cant slightly since the arms of the U-bolt do not contact or grip the side walls of the socketed member nor the flanges of the portion 40.

In either case, it will be noted in Figs. 1 and 4, that the elongated rigid member 20 extends along a very long portion of the bumper bar, tending to reinforce the bar, particularly when the hitch is not in use as a hitch and the cylinder 60 removed. Since the elongated rigid member rests upon a very long portion of the bumper bar flange 17 or 77 as the case may be, the flange tends to strengthen the member 20.

Various changes may be made to the form of the invention herein shown and described without departing from the spirit of the invention or scope of the claims.

What is claimed is:

1. A trailer hitch for a vehicle having a chassis including a rear cross frame member and a bumper assembly, including a bumper bar disposed rearwardly of the rear cross frame member and resilient braces connected between the chassis and the bumper bar, said trailer hitch including bumper bar-attaching means; cross frame member-attaching means including a substantially horizontally-disposed portion comprising a substantially flat elongated plate and flanges extending downwardly at the longitudinal edges of said plate, said cross frame member-attaching means also including an upwardly-extending portion, rigid with said plate; means for attaching said upwardly-extending portion to said rear cross frame member; coupling support means, including an elongated socketed member, having outer surfaces to slidably receive said flanges in face to face relationship with said surfaces, and a surface to slidably receive said plate in face to face relationship; means to detachably connect said socketed member with said rear cross frame-attaching means, coupling means carried by said coupling support means, including a cylinder slidable in the socket of the socketed member; means to detachably secure said coupling support means and coupling means together with a portion of said cylinder extending outwardly of said socketed member rearwardly of said bumper bar; and connecting means directly connecting said socketed member and bumper bar-attaching means and supporting said socketed member.

2. A trailer hitch according to claim 1 characterized in that said connecting means is a slidable connection including portions slidable over the outer surfaces of said socketed member, whereby when said bumper bar is forced forwardly said portions of said connecting means will slide over portions of said surfaces of said socketed member.

3. A trailer hitch according to claim 1 characterized in that said connecting means is a U-shaped member having portions in contact with said surfaces and supported by said bumper bar-attaching means.

4. A trailer hitch according to claim 1 characterized in that said socketed member opens rearwardly, has a flat upper outer face and is provided with a horizontally-disposed flange at the end portion thereof opposite its open end, with said upper face of said horizontally-disposed flange in substantially the same horizontal plane as the upper face of said socketed member, and means is provided to directly detachably connect said horizontally-disposed flange and said plate upon rearward movement of said socketed member with respect to said rear cross frame-attaching means in order to extend the distance between the forward end of said horizontally-disposed flange and the rearward end of said socketed member.

5. A trailer hitch for a vehicle having a chassis and a rear bumper bar assembly including a bumper bar and resilient braces between the chassis and bumper bar, said trailer hitch including bumper bar-attaching means; chassis-attaching means; slidable connection means disposed between said bumper bar-attaching means and chassis-attaching means for sliding said bumper bar-attaching means toward said chassis-attaching means upon movement of said bumper bar toward said chassis, including a U-bolt carried by said bumper bar-attaching means; coupling support means connected to said chassis-attaching means including a member, having a curved lower outer surface and side walls having flat outer faces, connected at one end portion to said chassis-attaching means and disposed within the U-shaped opening in said U-bolt at the other end portion of the last-named member; and coupling means for coupling with the coupling member of a trailer, said coupling means being carried by said coupling support means.

6. A trailer hitch for a vehicle having a chassis and a rear bumper bar assembly including a bumper bar and resilient braces between the chassis and bumper bar, said trailer hitch including bumper bar-attaching means; chassis-attaching means; slidable connection means disposed between said bumper bar-attaching means and chassis-attaching means for sliding said bumper bar-attaching means toward said chassis-attaching means upon movement of said bumper bar toward said chassis, including a U-bolt carried by said bumper bar-attaching means; coupling support means connected to said chassis-attaching means, including a member, having a curved lower outer surface and side walls having flat outer faces, connected at one end portion to said chassis-attaching means and disposed within the U-shaped opening in said U-bolt at the other end portion of the last-named member, the last-named member having a socket, said coupling having a portion slidable in said socket; means to couple together the last-named member and the last-named portion; coupling support means connected to said chassis-attaching means; and coupling means for coupling with the coupling means of a trailer, said coupling means being carried by said coupling-support means.

References Cited in the file of this patent

UNITED STATES PATENTS

| | | |
|---|---|---|
| 2,484,751 | Schultz | Oct. 11, 1949 |
| 2,576,383 | Avery | Nov. 27, 1951 |
| 2,622,892 | Lowman | Dec. 23, 1952 |
| 2,665,923 | Perry | Jan. 12, 1954 |